United States Patent
Ohmori et al.

(10) Patent No.: US 6,803,023 B1
(45) Date of Patent: Oct. 12, 2004

(54) COMPOSITE STRUCTURE FOR DEODORIZATION OR WASTEWATER TREATMENT

(75) Inventors: Masahiro Ohmori, Chiba (JP); Akihiko Kotera, Kawasaki (JP); Hidenori Nakamura, Chiba (JP); Masayoshi Nobiki, Chiba (JP)

(73) Assignee: Showa Denko Kabushiki Kaisha, Tokyo (JP)

( * ) Notice: Subject to any disclaimer, the term of this patent is extended or adjusted under 35 U.S.C. 154(b) by 772 days.

(21) Appl. No.: 09/677,188

(22) Filed: Oct. 2, 2000

Related U.S. Application Data

(60) Provisional application No. 60/162,231, filed on Oct. 29, 1999.

(30) Foreign Application Priority Data

Oct. 1, 1999 (JP) .......................................... 11-282060

(51) Int. Cl.[7] .......................... B01D 50/00; B01D 53/34
(52) U.S. Cl. .................................... 422/177; 422/184.1
(58) Field of Search .............................. 422/177, 184.1; 252/186.2

(56) References Cited

U.S. PATENT DOCUMENTS 5,541,096 A * 7/1996 Nomura et al. ............. 435/176
6,284,314 B1 * 9/2001 Kato et al. .................. 427/245
6,342,128 B1 * 1/2002 Tabatabaie-Raissi et al. .... 204/157.15

FOREIGN PATENT DOCUMENTS

| JP | 07-148434 | 6/1995 | ............ B01J/35/02 |
| JP | 10-028875 | 2/1998 | ............ B01J/35/08 |
| JP | 10-219236 | 8/1998 | ............ C09K/3/32 |
| JP | 10-249210 | 9/1998 | ............ B01J/35/02 |
| JP | 11-188269 | 7/1999 | ............ B01J/35/02 |
| WO | WO-92/08768 | 5/1992 | ............ C09K/3/32 |

* cited by examiner

Primary Examiner—M. Alexandra Elve
(74) Attorney, Agent, or Firm—Sughrue Mion, PLLC

(57) ABSTRACT

A composite structure having a photocatalytic function and can be used for deodorization and wastewater treatment, comprising a foamed or porous substrate having apparent specific gravity of 0.9 to 0.01 and finely divided titanium oxide particles having a photocatalytic function which are adhered onto the surface of the foamed or porous substrate. Gas such as air having offensive odor or wastewater is allowed to be in contact with the composite structure having a photocatalytic function, whereby smelly or harmful substances contained in the gas or wastewater are decomposed.

15 Claims, No Drawings

COMPOSITE STRUCTURE FOR DEODORIZATION OR WASTEWATER TREATMENT

CROSS-REFERENCE TO RELATED APPLICATION

This application is an application filed under 35 U.S.C. §111(a) claiming benefit pursuant to 35 U.S.C.§119(e)(1) of the filing date of Provisional Application No. 60/162,231 filed Oct. 29, 1999, pursuant to 35 U.S.C. §111(b).

BACKGROUND OF THE INVENTION (1) Field of the Invention

This invention relates to deodorization and/or wastewater treatment utilizing a photocatalytic reaction. More specifically it relates to a composite structure having a photocatalytic function, which is capable of decomposing smelly or harmful substances contained in air or other gas and/or wastewater effectively, and to the utilization thereof.

(2) Description of the Related Art

In recent years, researches and developments have been made actively for utilizing a photocatalytic function possessed by titanium oxide and other metal oxides. That is, these metal oxides such as titanium oxide and the like have excellent functions for preventing contamination by removing harmful substances, purifying the air by decomposing ammonia, a sulfur compound and the like contained in the air, sterilizing a kind of bacteria and so on. Therefore, applications of these metal oxides are expected in various fields.

Finely divided titanium oxide particles having a photocatalytic function (photocatalytic property), (hereinafter, photocatalytic titanium oxide particles are simply referred to as "titanium oxide" when appropriate), are used in a variety of forms such as bulk particles, sols, thin films and the like depending on purposes. However, in the field of deodorization and wastewater treatment, titanium oxide particles are usually used not alone, but used in combination with a substrate such as, for example, glass, ceramics or the like in such a form supported on the substrate in many cases. Many methods of supporting titanium oxide particles on a substrate have been proposed. In order to enhance adherence of titanium oxide particles to a substrate and to prevent detachment of titanium oxide particles from the substrate, the following methods are generally employed: (i) after a titanium oxide coating film being formed on a substrate, heat-treating the film to sinter on the substrate at high temperatures; (ii) impregnating a dispersion of titanium oxide particles into pores of a porous substrate; and (iii) forming a titanium oxide coating film on a substrate through a binder.

However, in the case of method (i) of heat-treating a titanium oxide coating film to sinter on a substrate at a high temperature, the titanium oxide particles grow largely to lower their specific surface area during heat treatment. Consequently, their photocatalytic function becomes decreased. In the case of method (ii) of impregnating a dispersion of titanium oxide particles into pores of a porous substrate, it is difficult to prevent sufficiently the detachment of the titanium oxide particles. The method (iii) of forming a titanium oxide coating film on a substrate through a binder is generally employed. However, this method is still unsatisfactory.

SUMMARY OF THE INVENTION

Considering the aforementioned background art, an object of the present invention is to provide a composite structure for deodorization and/or wastewater treatment having finely divided titanium oxide particles having a photocatalytic function, supported on a substrate, which exhibits great photocatalytic activity, thereby having improved deodorization and/or wastewater-treatment properties, in general, the finely divided titanium oxide particles of which are hardly detached from the substrate to exhibit an enhanced photocatalytic property over a long period of time.

The present inventors made extensive researches into a composite structure having a photocatalytic function, which is capable of decomposing effectively smelly or harmful substances contained in the air or wastewater. As a result, it was found that the above-objects can be satisfied by a composite structure containing finely divided titanium oxide particles adhered to the surface of a foamed or porous substrate having small apparent specific gravity. The present invention has been completed on the basis of the above-finding.

Thus, in one aspect of the present invention, there is provided a composite structure, which has a photocatalytic function and can be used for deodorization and wastewater treatment, comprising a foamed or porous substrate having apparent specific gravity of 0.9 to 0.01 and finely divided titanium oxide particles which are adhered onto the surface of the foamed or porous substrate.

In another aspect of the present invention, there is provided a method for deodorizing air or other gas having offensive odor or treating wastewater, comprising the step of allowing air or other gas having offensive odor or wastewater to be in contact with a composite structure having a photocatalytic function, which comprises a foamed or porous substrate having apparent specific gravity of 0.9 to 0.01 and finely divided titanium oxide particles adhered onto the surface of the foamed or porous substrate, whereby smelly or harmful substances contained in the air or other gas or wastewater are decomposed.

DETAILED DESCRIPTION OF THE PREFERRED EMBODIMENTS

The finely divided titanium oxide particles having a photocatalytic function used in the invention are not particularly limited. These particles can be commercially available titanium oxide powders. However, the finely divided titanium oxide particles are preferably in the form of a sol which can be obtained in the process of synthesizing a titanium oxide as described below.

It is known that titanium oxide has forms of anatase, rutile and brookite. A desirable titanium oxide is in a form of finely divided particles since the titanium oxide exhibiting a high photocatalytic property is desired. However, it is difficult to prepare titanium oxide particles having an average particle diameter of smaller than about 0.005 $\mu$m. Accordingly, the average particle diameter usually ranges from about 0.005 $\mu$m to 0.3 $\mu$m, and preferably from about 0.01 $\mu$m to about 0.1 $\mu$m. The specific surface area of the titanium oxide particles preferably at least about 20 $m^2/g$, and more preferably ranges from about 50 $m^2/g$ to about 300 $m^2/g$.

Known processes for preparing finely divided titanium oxide particles include neutralizing/hydrolyzing titanyl sulfate or titanium tetrachloride, and hydrolyzing a titanium alkoxide compound.

Considering that a formed titanium oxide is highly active and its production cost is low, titanyl sulfate and titanium tetrachloride are desirably used as a raw material. A method of hydrolyzing a titanium alkoxlde compound is advantageous in that it can provide a very small sol of titanium oxide having excellent powder properties. However, this method has a very high production cost as compared with the method employing titanyl sulfate or titanium chloride as a raw material.

By drying the aqueous sol obtained by hydrolysis, there can be obtained fine titanium oxide powders. The powders are then dispersed again in water or a mixture of water and an organic solvent to obtain coating liquid for forming a thin film of titanium oxide particles. However, the coating liquid thus obtained is not preferable for the following reasons. The titanium oxide which is a hydrolyzed product aggregates easily because of its high surface activity which increases in inverse proportion to its particle size. Therefore, it is difficult to disperse in water again after drying. Further, the thin film obtained from the titanium oxide particles is deteriorated in transparency and a photocatalytic property, and weakly bonded to a substrate. Accordingly, the aqueous sol formed by hydrolysis is used as a coating liquid, preferably, after admixing a binder therewith, if desired, through steps of removing dissolved chlorine, and concentrating by dehydration or diluting with water. The aqueous sol may be used as a coating liquid, if desired, by incorporating an organic solvent therein, to make a dispersion of finely divided titanium oxide particles in a mixture of water and organic solvent.

A dispersing medium for use in preparing the above preferable titanium oxide sol is water or a mixture of water and a hydrophilic organic solvent. As examples of the hydrophilic organic solvent, there can be mentioned alcohols such as methanol, ethanol and ethylene glycol; ketones such as acetone; esters such as ethyl acetate; and cellosolves such as ethyl cellosolves.

A preferable titanium oxide sol is a water-dispersed titanium oxide sol disclosed in. Japanese Unexamined Patent Publication (Kokai) No. H11-43327. By using this sol, a titanium oxide thin film having excellent transparency and peel strength can be formed on a foamed or porous substrate.

When an aqueous titanium tetrachloride solution having a concentration of about 0.05 mol/l to about 10 mol/l while the aqueous solution is refluxed, a titanium oxide sol having a concentration of about 0.05 mol/l to about 10 mol/l is obtained. The as-obtained sol can be used, as it is, as a coating solution containing titanium oxide at a desired concentration. Alternatively, by adding water to the sol as obtained by hydrolysis or by concentrating the as-obtained sol, the concentration of titanium oxide in the sol can be varied within the above-mentioned preferred range.

If desired, a stabilizer for preventing aggregation can be added to the sol obtained by hydrolysis. The stabilizers include, for example, a variety of surfactants such as a commonly used non-ionic surfactants. The amount of the stabilizer used is generally in the range of about 0.1% to 1% by weight based on the aqueous sol.

To enhance a film-forming property, a small amount, for example, about 10 ppm to about 10,000 ppm of a water-soluble polymer can be incorporated in the titanium oxide sol. The water-soluble polymers used include, for example, polyvinyl alcohol, methyl cellulose, ethyl cellulose, calboxycellulose and starch.

By the term "foamed or porous substrate" used herein, which is used for supporting finely divided titanium oxide particles on a composite structure of the invention, we mean a substrate having a multiplicity of pores communicating with the surface thereof. The substrate may have closed cells provided that it has open cells. There is no special limitation of shapes and materials of the foamed or porous substrate. However, substrates having a spherical shape or analogous shapes are preferably used in view of good handling property. The average particle diameter of the spherical substrate preferably in the range of about 1 mm to about 10 mm.

As specific examples of the foamed or porous substrates, there can be mentioned expanded obsidian, or foamed or porous perlite, a rounded product of small-gage wire, ceramic fiber or the like, and a foamed cement product. Among them, expanded obsidian and a foamed or porous perlite are preferred, because it can support a large amount of titanium oxide particles thereon and the supported titanium oxide particles are hardly detached therefrom. The expanded obsidian, and foamed or porous perlite are usually prepared by heat-treating pulverized obsidian or perlite at a temperature of about 500° C. to about 1,000° C.

The foamed or porous substrate has an apparent specific gravity ranging from about 0.9 to about 0.01, preferably from about 0.7 to about 0.01, and more preferably about 0.4 to about 0.01. A composite structure having a small apparent specific gravity can be obtained by using the foamed or porous substrate having such a small apparent specific gravity. When the composite structure having such a small apparent specific gravity is used for deodorization of a gas with offensive odor or treatment of wastewater, the composite structure can float or is fluidized in the air, or in and on wastewater. As a result, the contact of the composite structure with smelly gas or wastewater is greatly enhanced. Thus, a deodorization efficiency is increased. In the case of treating wastewater, the composite structure floats on the wastewater, therefore, UV irradiation efficiency is increased, and the effect of a wastewater treatment is improved. A foamed or porous substrate having a specific gravity exceeding about 0.9 cannot fully exhibit the aforementioned features as a material for deodorization and wastewater treatment. Also, a foamed or porous substrate having an apparent specific gravity of smaller than about 0.01 generally has a low strength and a poor shape-retention.

In the case of supporting finely divided titanium oxide particles on a foamed or porous substrate, to enhance the adhesion of the titanium oxide particles to the substrate, it is possible to sinter by heat treatment, to adhere with a binder, or to impregnate into pores of the substrate. Of these, in view of a photocatalytic property of the composite structure and operability for preparing the composite structure, adhering with a binder is the most effective and preferable.

As a binder, a phosphor-containing compound, a zirconium-compound and a silicon-containing compound are preferably used. These compounds may be used either alone or as a combination of at least two thereof.

As specific examples of the zirconium-containing compound, there can be mentioned water-soluble zirconium compounds such as zirconium oxychloride, zirconium hydroxychloride, zirconium nitrate, zirconium sulfate, zirconium acetate and zirconium ammonium carbonate; and organic solvent-soluble zirconium compounds such as zirconium propionate. Further, complexes of a zirconium compound having at least one of hydroxyl, carbonate and alkylcarboxyl groups and its polymer can also be used. The amount of the zirconium compound as a binder can be selected appropriately from the range of about 3 to about 200 parts by weight based on 100 parts by weight of the titanium oxide particles.

AS specific examples of the phosphor-containing compound, there can be mentioned orthophosphoric acid, pyrophosphoric acid, aluminum phosphate and polyphosphoric acid. The amount of the phosphor-containing compound as a binder can be selected appropriately from the range of about 1 to about 100 parts by weight based on 100 parts by weight of the titanium oxide particles.

As specific examples of the silicon-containing compound, there can be mentioned water glass; silicates such as calcium silicate, tetrachlorosilicate, tetrabromosilicate, tetraethylsilicate, tetramethylsilicate, tetra-n-propoxysilicate, tetrabuthoxysilicate, methyltrimethylsilicate, methyltriethylsilicate, methyltributoxysilicate, ethyltrimethylsilicate, ethyltriethylsilicate, phenyltrimethylsilicate, phenyltriethylsilicate, dimethyldimethylsilicate, dimethyldiethylsilicate, phenylmethyldimethylsilicate and phenylmethyldiethylsilicate; these hydrolysates; and their dehydrates. The amount of the silicon-containing compound as a binder can be selected appropriately from the range of about 10 to about 100 parts by weight based on 100 parts by weight of the titanium oxide particles.

For the formation of a film by coating an aqueous sol of finely divided titanium oxide particles or a coating liquid comprising the finely divided titanium oxide particles and a binder on a foamed or porous substrate, the following methods are employed: impregnating the substrate with the sol or coating liquid; spraying the sol or coating liquid on the substrate; coating the substrate with the sol or coating liquid by a brushing and other coating methods. Among them, a method of impregnating the substrate with the titanium oxide-containing sol or coating liquid is preferable. The amount of the sol or coating liquid applied on the substrate is in the range of about 0.01 mm to about 0.2 mm expressed in terms of a thickness of the liquid coating film.

A target thin coating film can be obtained by drying to remove a solvent after coating, and can be used, as it is, for a catalyst. However, heat treatment is generally carried out to enhance the adhesion of the titanium oxide particles to the substrate. The heat-treating temperature ranges commonly from about 20° C. to about 200° C. preferably from about 20° C. to about 150° C. The heat-treating time is in the range of about 5 minutes to about 30 minutes.

If the foamed or porous substrate is made of a heat-resistant material such as metal or ceramic material, a thin coating film after being formed can be sintered. Thereby, the thin coating film becomes adhered to the substrate more strongly, and increases its hardness still more. A preferable sintering temperature is about 200° C. or higher. However, sintering under severe conditions must be avoided because sintering sometimes causes growth of particles during heat treatment in the course of sintering. Thus, the specific surface area of the titanium oxide particles may be decreased, and the photocatalytic property is possibly deteriorated. Generally, the highest sintering temperature may be decided depending on the heat resistance of the foamed or porous substrate. Usually the sintering temperature is determined commonly up to about 800° C. Sintering may be performed in any atmosphere, of course, in the air. The sintering time is not particularly limited, but usually ranges from about 1 minute to about 60 minutes. The thickness of the thin film obtained by sintering ranges from about 0.02 $\mu$m to about 1.0 $\mu$m when the amount of the sol or coating liquid is as mentioned above.

A composite structure of the invention can be utilized for deodorizing air or other gas with offensive odor and/or treating wastewater, i.e., for decomposing smelly or harmful substances contained in the gas or the wastewater.

In the case when using the composite structure as a deodorant, deodorization for indoor space can be attained by placing the composite structure in a netted bag or the like, and then by irradiating the composite structure with UV rays of black light. A deodorizing effect will be increased by stirring the air in the indoor space with a fan or the like. Further, the highest deodorizing effect will be obtained by using a deodorizing apparatus designed so as to whirl up the composite structure irradiated with UV rays, because frequency of bringing the composite structure into contact with smelly components is increased.

In the case when using the composite structure to decompose harmful substances contained in wastewater, the composite structure may be allowed to float on a flow of wastewater containing harmful substances. If desired, adequate artificial light source such as a UV lamp or the like can be provided in place of or in addition to the sunlight. In order to prevent sink of the composite structure into wastewater, the composite structure can be placed on a netted receiver pan. Otherwise, the composite structure contained in a netted bag can be provided in a wastewater treatment machine so as to bring the composite structure into contact with a flow of wastewater.

The present invention will now be specifically described by way of the following working examples, which should not be construed as limiting the scope of the invention. In the working examples % represents percent by weight unless otherwise specified.

Preparation of Titanium Oxide Sol

A reaction vessel equipped with a reflux condenser was charged with 954 ml of distilled water, followed by heating up to 95° C. Then, 46 ml of an aqueous solution of titanium tetrachloride (Ti content: 16.3%, specific gravity: 1.59, purity: 99.9%) was dropwise added into the reaction vessel at a rate of about 5 ml/min, while keeping the stirring rate of the reaction mixture in the vessel at about 200 rpm. At this time, care was taken so that the temperature of the reaction liquid would not fall. Consequently, the concentration of titanium tetrachloride in the reaction liquid was 0.25 mol/l (which corresponds to 2% in terms of the weight of titanium oxide particles).

In the reaction vessel, the reaction liquid started to become turbid immediately after the beginning of dropwise addition. However, the reaction liquid was kept at the temperature as it was. After the dropwise addition was completed, the temperature was raised up to about a boiling point (104° C.) by heating. The reaction liquid was held for 60 minutes in this state to terminate the hydrolysis reaction completely. After cooling, residual chlorine produced by the reaction was removed by electrodialysis to indicate pH=1.9 (chloride ion content: 600 ppm). Thereafter, as an auxiliary for film-forming, 0.1%, based on the weight of the produced titanium oxide, of polyvinyl alcohol which is a water-soluble polymer was added to prepare a titanium oxide sol (TiO$_2$ content: about 0.25 mol/l). This sol was stable, and sedimentation of the produced titanium oxide particles was not observed even after the lapse of more than 30 days.

A part of the thus-prepared sol was filtered and then dried at 60° C. in a vacuum oven to prepare a titanium oxide powder. Quantitative analysis of the titanium oxide powder by the X-ray diffraction method revealed that the ratio of (a peak intensity of brookite-type 121 face) to (a peak. intensity where the three types of crystals are superimposed) was 0.38; and the ratio of (a main peak intensity of rutile-type) to (a peak intensity where the three types of crystals are superimposed) was 0.05. These ratios tell that the produced titanium oxide was crystalline and contained about 70.0% of brookite type, about 1.2% of rutile type and about 28.8% of anatase type. When the titanium oxide particles were observed by a transmission-type electron microscope, the average particle diameter of primary particles was 0.015 μm. The BET measurement showed that the specific surface area of the particles was 100 m²/g.

Preparation of Coating Liquid B

To the foregoing titanium oxide sol, 5% (in terms of the weight of $SiO_2$), based on the weight of the titanium oxide content, of tetramethyl-orthosilicate [$Si(OCH_3)_4$] was added as a binder to prepare a titanium oxide coating liquid B.

Preparation of Coating Liquid A

A titanium oxide sol was prepared in the same manner as for the preparation of the coating liquid B, except that conditions of condensation and electrodialysis were changed to obtain an aqueous titanium oxide sol of pH 5.5 containing 11% of titanium oxide particles. To 36.6 g of this aqueous titanium oxide sol, an aqueous solution containing 2.2 g of zirconium hydroxychloride (20% in terms of $ZrO_2$ weight) and 11.4 g of pure water were added to prepare a coating liquid A.

EXAMPLE 1

Into 100 ml of coating liquid A, 100 g of "Fuyolite #2" (expanded obsidian supplied by Fuyo Perlite Co.: apparent specific gravity: 0.10–0.16 g/cm³, average particle diameter: 1.2–2.5 mm) as a substrate for supporting a titanium oxide thereon was placed. After being stirred well, the mixture was allowed to stand for 1 hour so as to have a full affinity for the substrate. Then, the substrate was taken out by filtration, then dried and heated at 150° C. for 1 hour. Thus, titanium oxide particles contained in the coating liquid A was supported on the substrate to prepare a composite structure. The amount of the titanium oxide supported was about 2% based on the weight of substrate weight.

The photocatalytic property (deodorizing property) of the composite structure having supported thereon the titanium oxide particles, thus obtained, was evaluated by the following way. At first, 100 g of the composite structure was put into 100 ml of pure water to be thereby washed with water for removing dust and unreacted residue. About 0.19 of the composite structure was spread uniformly in a cylindrical perforated cell having an area of 8.5 cm² to set the same in the central portion inside a chamber of 1.3 liter in volume made of Pyrex glass provided with a fan. Then, 500 ppm of acetaldehyde that is a smelly constituent was injected into the chamber. Thereafter, while whirling the inner air at an air flow rate of 0.1 l/min., the cell was irradiated with UV rays by a UV lamp (light intensity at 365 nm: 0.4 mW/cm). The deodorizing property was investigated by decomposition percentage calculated from the residual amount of acetaldehyde after 60 minute UV irradiation. The results are shown in Table 1.

Then, the wastewater treatment property of the composite structure was evaluated. Measurement was carried out by the following method. Water dyed with an organic colorant (red) was taken as wastewater. 100 ml of this wastewater was poured into a wide-mouthed bottle. Then, 1 g of the composite structure was incorporated into the wastewater. Thereafter, the wastewater was irradiated with UW rays lamp by a UV lamp (light., intensity at liquid level: 0.2 mW/cm² at 365 nm) located above the bottle. Color change (fading degree) of the wastewater was observed by the naked eyes and evaluated according to the following three ratings 1, 2 and 3.

Rating 1: fading was observed, i.e., wastewater was almost changed into crystal-clear water.

Rating 2: fading was observed admitted to some extent, but remaining color was observed.

Rating 3: fading was not admitted.

The results are shown in Table 1.

EXAMPLE 2

The same procedure as that of Example 1 was repeated except that the substrate was replaced by "Fuyolite #.1" (expanded obsidian supplied by Fuyo Perlite Co.: apparent specific gravity: 0.18–0.26 g/cm³, average particle diameter: 0.6–1.2 mm) with all other conditions remaining the same to obtain a composite structure. The deodorizing property and the wastewater treatment property were evaluated by the same way as described in Example 1. The results are shown in Table 1.

EXAMPLE 3

The same procedure as that of Example 1 was repeated except that coating liquid B was used in place of coating liquid A with all other conditions remaining the same to prepare a composite structure. The deodorizing property and the wastewater treatment property were evaluated in the same manner as described in Example 1. The results were shown in Table 1.

COMPARATIVE EXAMPLE 1

The same procedure as that of Example 1 was repeated except that volcanic glass (apparent specific gravity: about 2.4) was used as a substrate instead of expanded obsidian used in Example 1 with all other conditions remaining the same to prepare a composite structure having supported thereon a titanium oxide. The deodorizing property and the wastewater treatment property of the composite structure were evaluated in the same manner as described in Example 1. The results are shown in Table 1.

TABLE 1

| Examples/ Comparative Example | Coating liquid | Deodorizing performance (Decomposition %) | Wastewater treatment capacity (Rating) |
| --- | --- | --- | --- |
| Example 1 | A | 50 | 1 |
| Example 2 | A | 60 | 1 |
| Example 3 | B | 40 | 1 |
| Com. Ex. 1 | A | 20 | 2 |

The composite structure of the invention comprises a foamed or porous substrate with a small specific gravity having supported thereon finely divided titanium oxide particles. Accordingly, when it is used for deodorization, it can float or is fluidized in the air or water to enhance the contact of the composite structure with gas having offensive odor. Therefore, a deodorizing property can be improved. Also, when it is used for wastewater treatment, the composite structure floats on the surface of the wastewater. Consequently, irradiating efficiency of UV rays is enhanced, leading to improvement of a wastewater treatment property. As such, a great photocatalytic activity can be exhibited. Further, generally, titanium oxide particles are hardly detached from the substrate. Accordingly, photocatalytic function can continue for a longed period of time.

What is claimed is:

1. A composite structure having a photocatalytic function which can be used for deodorization and wastewater treatment, comprising a foamed or porous substrate having apparent specific gravity of 0.9 to 0.01 and finely divided titanium oxide particles having an average particle diameter of 0.005 μm to 0.3 μm which are adhered onto the surface of the foamed or porous substrate.

2. The composite structure according to claim 1, wherein said composite structure is capable of floating on water.

3. The composite structure according to claim 1, wherein the finely divided titanium oxide particles are adhered to the substrate through a binder.

4. The composite structure according to claim 3, wherein the binder is at least one compound selected from the group consisting of phosphor-containing compounds, zirconium-containing compounds and silicon-ontaining compounds.

5. The composite structure according to claim 1, wherein the substrate is made of at least one material selected from the group consisting of expanded obsidian, and foamed or porous perlite.

6. A method for deodorizing gas having offensive odor or treating wastewater, comprising the step of allowing gas having offensive odor or wastewater to be in contact with a composite structure having a photocatalytic function, which comprises a foamed or porous substrate having apparent specific gravity of 0.9 to 0.01 and finely divided titanium oxide particles having an average particle diameter of 0.005 $\mu$m to 0.3 $\mu$m which are adhered onto the surface of the foamed or porous substrate, whereby smelly or harmful substances contained in the gas or wastewater are decomposed.

7. The method for deodorizing air having offensive odor or treating wastewater according to claim 6, wherein the air having offensive odor or wastewater is allowed to be in contact with the composite structure having a photocatalytic function, which floats on water.

8. The method for deodorizing air having offensive odor or treating wastewater according to claim 6, wherein the finely divided titanium oxide particles are adhered to the substrate through a binder.

9. The method for deodorizing air having offensive odor or treating wastewater according to claim 8, wherein the binder is at least one compound selected from the group consisting of phosphor-containing compounds, zirconium-containing compounds and silicon-containing compounds.

10. The method for deodorizing air having offensive odor or treating wastewater according to claim 6, wherein the substrate is made of at least one material selected from the group consisting of expanded obsidian, foamed or porous perlite, a rounded product of wire, ceramic fiber, and a foamed cement product.

11. The composite structure according to claim 3, wherein the binder is a water-soluble zirconium compound.

12. The composite structure according to claim 11, wherein the water-soluble zirconium compound is selected from the group consisting of zirconium nitrate, zirconium sulfate, zirconium acetate, zirconium ammonium carbonate, zirconium propionate, complexes of a zirconium compound having at least one of hydroxyl, carbonate and alkylcarboxyl groups, and polymers thereof.

13. The composite structure according to claim 3, wherein the binder is a silicate.

14. The composite structure according to claim 1, wherein the foamed or porous substrate has an apparent specific gravity of 0.7 to 0.01.

15. The composite structure according to claim 1, wherein the foamed or porous substrate has an apparent specific gravity of 0.4 to 0.01.

* * * * *